(12) United States Patent
Debregeas et al.

(10) Patent No.: US 11,934,007 B2
(45) Date of Patent: Mar. 19, 2024

(54) ASSEMBLY OF AN ACTIVE SEMICONDUCTOR COMPONENT AND OF A SILICON-BASED PASSIVE OPTICAL COMPONENT

(71) Applicant: ALMAE TECHNOLOGIES, Marcoussis (FR)

(72) Inventors: Hélène Debregeas, Boullay les Troux (FR); François Lelarge, Paris (FR); David Carrara, Savigny sur Orge (FR)

(73) Assignee: ALMAE TECHNOLOGIES, Marcoussis (FR)

( * ) Notice: Subject to any disclaimer, the term of this patent is extended or adjusted under 35 U.S.C. 154(b) by 276 days.

(21) Appl. No.: 17/624,922

(22) PCT Filed: Jul. 3, 2020

(86) PCT No.: PCT/EP2020/068800
§ 371 (c)(1),
(2) Date: Jan. 5, 2022

(87) PCT Pub. No.: WO2021/004930
PCT Pub. Date: Jan. 14, 2021

(65) Prior Publication Data
US 2022/0268997 A1 Aug. 25, 2022

(30) Foreign Application Priority Data
Jul. 5, 2019 (FR) ........................ 1907521

(51) Int. Cl.
*G02B 6/12* (2006.01)
*G02B 6/122* (2006.01)
(Continued)

(52) U.S. Cl.
CPC ..... *G02B 6/12004* (2013.01); *G02B 6/12002* (2013.01); *G02B 6/1228* (2013.01);
(Continued)

(58) Field of Classification Search
None
See application file for complete search history.

(56) References Cited

U.S. PATENT DOCUMENTS 9,762,334 B2  9/2017  Chang et al.
2013/0195137 A1  8/2013  Bowers et al.
(Continued)

FOREIGN PATENT DOCUMENTS

EP    3494424 A1    6/2019
WO  2016-077499 A2  5/2016

OTHER PUBLICATIONS

Zhiping Zhou et al: "On-chip light sourcees for silicon photonics", Light: Science & Applications, vol. 4, No. 11, Nov. 20, 2015 (Nov. 20, 2015), p. e358, XP055362361, DOI: 10.1038/lsa.2015.131 figure 10a (13 pages).
(Continued)

*Primary Examiner* — Chad H Smith
(74) *Attorney, Agent, or Firm* — Osha Bergman Watanabe & Burton LLP

(57) ABSTRACT

An assembly of an active semiconductor component and of a silicon-based passive optical component includes a carrier; and the active semiconductor component and the passive optical component both arranged on the carrier. The active semiconductor component includes a first set of semiconductor layers comprising at least one first waveguide configured to guide, in a first section of the assembly, at least one first optical mode; a second set of semiconductor layers, the set being superposed and making contact with the first set of layers, and including at least one second waveguide configured to guide at least one second optical mode. At least some of the layers of the first set of layers and of the second set of layers are doped to form, in a first region of the component, a PIN diode. The at least one first waveguide and the at least one second waveguide are configured to
(Continued)

allow evanescent coupling therebetween, in a second section of the assembly. The first set of layers is etched to form, in a second region of the active semiconductor component, a first surface flush with the second waveguide. The passive component includes a substrate; a set of silicon-compound layers comprising at least one waveguide configured to guide at least one optical mode. The at least one waveguide lies flush with a first surface of the set of layers, which surface is opposite a second surface of the set of layers making contact with a surface of the substrate. The first surface of the passive optical component makes contact with the first surface of the active semiconductor component in order to allow evanescent coupling between the at least one waveguide of the passive optical component and the at least one second waveguide of the active semiconductor component.

13 Claims, 10 Drawing Sheets

(51) Int. Cl.
G02B 6/136 (2006.01)
G02B 6/30 (2006.01)

(52) U.S. Cl.
CPC ............. *G02B 6/136* (2013.01); *G02B 6/305* (2013.01); *G02B 2006/12061* (2013.01); *G02B 2006/12123* (2013.01)

(56) References Cited

U.S. PATENT DOCUMENTS

| | | |
|---|---|---|
| 2015/0010266 A1 | 1/2015 | Webster et al. |
| 2015/0247974 A1 | 9/2015 | Painchaud et al. |
| 2016/0131837 A1* | 5/2016 | Mahgerefteh .......... G02B 6/124 385/14 |
| 2018/0252865 A1 | 9/2018 | Yoneda et al. |
| 2018/0321445 A1 | 11/2018 | Piazza et al. |
| 2019/0089111 A1 | 3/2019 | Lee et al. |

OTHER PUBLICATIONS

Guang-Hua Duan et al: "Hybrid III-V on Silicon Lasers for Photonic Integrated Circuits on Silicon", IEEE Journal of Selected Topics in Quantum Electronics, vol. 20, No. 4, Jul. 1, 2014 (Jul. 1, 2014), pp. 158-170, XP055198161, ISSN: 1077-260X, DOI: 10.1109/JSTQE.2013.2296752 cité dans la demande (13 pages).

International Search Report and Written Opinion in corresponding International Application No. PCT/EP2020/068800, dated Oct. 1, 2020 (20 pages).

* cited by examiner

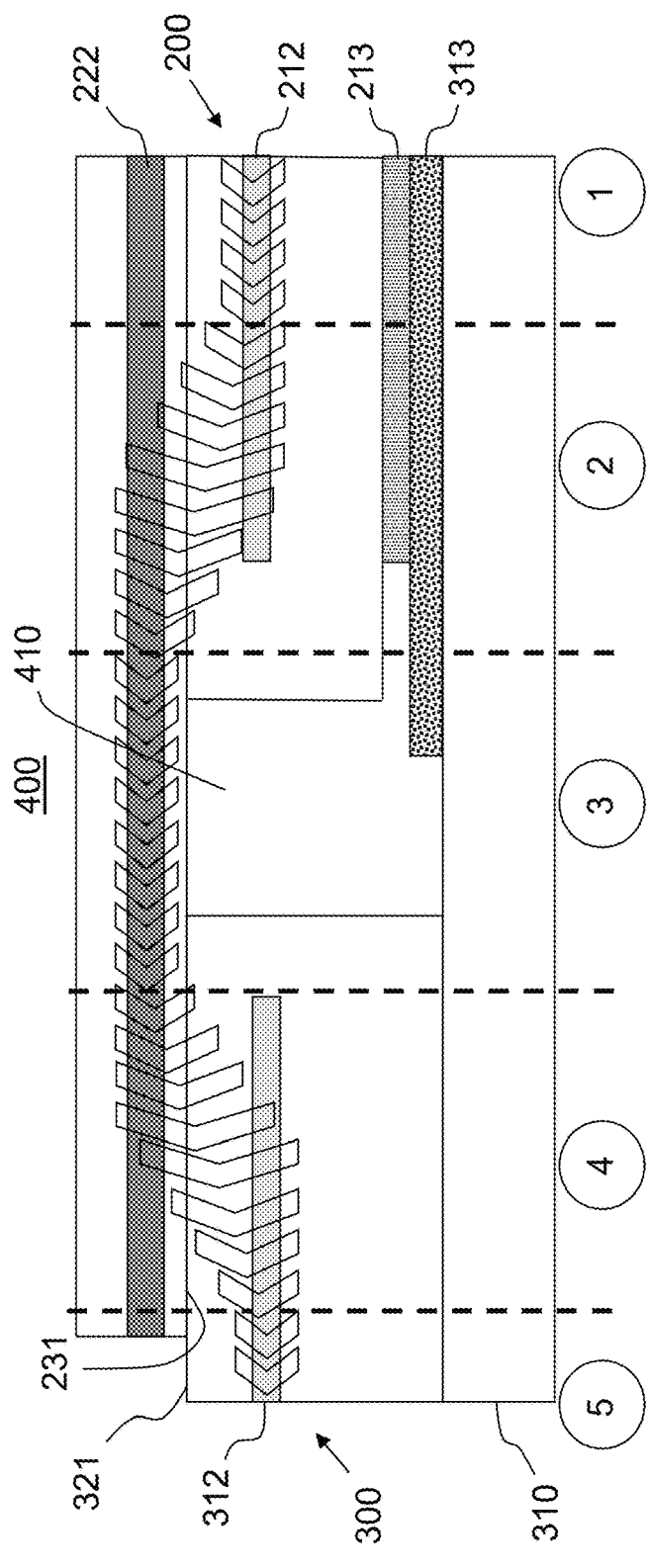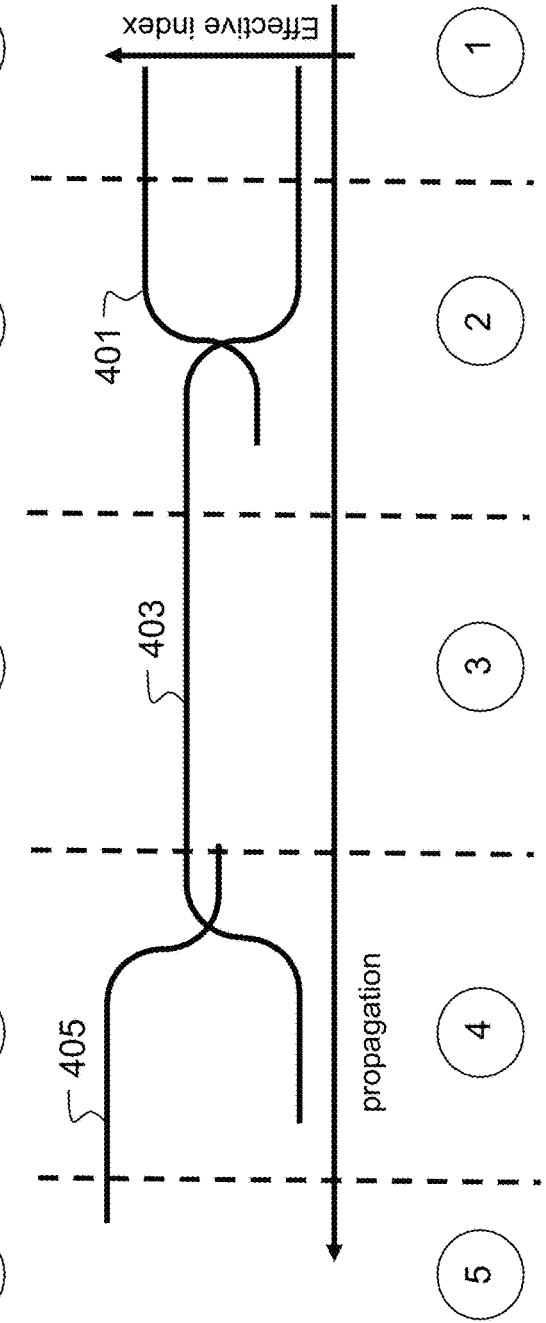
FIG.4A
FIG.4B

ASSEMBLY OF AN ACTIVE SEMICONDUCTOR COMPONENT AND OF A SILICON-BASED PASSIVE OPTICAL COMPONENT

TECHNICAL FIELD OF THE INVENTION

The present invention relates to an assembly of an active semiconductor component and of a silicon-based passive optical component, to a process for fabricating such an assembly and to a method for coupling waveguides of components of such an assembly.

PRIOR ART

The technology referred to as silicon photonics, "SiPho" below, embraces the study and applications of optical components ("SiPho components" below) that use silicon as optical propagation medium. SiPho components may be fabricated using the fabrication technologies of semiconductors and, as silicon is used as substrate in most integrated circuits, it is possible to create hybrid devices in which optical and electronic components are integrated into the same substrate, this making the SiPho technology particularly attractive. In particular, SiPho components are used in many applications, such as passive waveguides, photodiodes, or even modulators. Thus, the main element of SiPho components is silicon and they may also comprise, nonlimitingly, silicon oxides ($SiO_2$), silicon nitrides (SiN, $Si_2N_3$, $Si_2N$, $Si_3N_4$), and/or silicon oxynitrides (SiON).

However, because of the nature of the materials used (indirect bandgap semiconductors), the SiPho technology does not allow active functions, such as an optical amplification for example, to be generated. It is therefore sought to integrate, into SiPho circuits, active semiconductor components, i.e. components capable of generating a modification of an optical property of a light beam when they are subjected to a current or voltage source. Active semiconductor components for example comprise materials capable of generating optical gain, for example, grown epitaxially on substrates, crystals of semiconductors such as gallium arsenide (GaAs), gallium nitride (GaN), or indium phosphide (InP). Nevertheless, one difficulty is the degree of optical coupling between the waveguides produced by means of these two technologies (SiPho and active components) with minimal coupling losses and at low cost. Specifically, depending on the materials from which the components are made, the optical modes that propagate through the waveguides have different geometries, this complicating coupling. Thus, for example, the geometry of a mode in an Si waveguide is typically $0.7 \times 0.7$ $\mu m^2$; it is typically $1 \times 1.3$ $\mu m^2$ in a waveguide on an InP substrate and more than $4 \times 4$ $\mu m^2$ in an $SiO_2$ waveguide.

A first approach is to butt couple the waveguides. To attempt to increase the overlap between the modes and to decrease coupling losses, it is known to implement converters of mode size in the two waveguides (see for example Janiak et al. [Ref 1] and Hirohito [Ref 2]). In order to limit the degrees of freedom of alignment, which are 6 in number (3 translations and 3 rotations), most solutions involve mounting the two components flipped with respect to each other on a common substrate (flip-chip mounting). Vertical alignment is then ensured by the presence of points of support of defined height, and horizontal alignment is ensured by specific high-precision aligning equipment (precision of about 1 $\mu m$). In the optimal case, coupling losses of −2 dB are then achieved. However, this type of coupling has a very low alignment tolerance, because of the mismatch of the modes, there typically being 3 dB of additional coupling losses for every 1 $\mu m$ of misalignment.

To overcome these limitations, at the price of a much higher cost, alternative solutions have been proposed that use optical devices placed in the free space located between the waveguides to be coupled to attenuate the mismatch of the modes (see for example Gao et al. [Ref 3]). Thus, FIG. 1A illustrates an example of butt coupling between an SiPho component 10 comprising a waveguide 12 (for example Si, SiN or SiON in $SiO_2$) and an active semiconductor component 11 comprising a waveguide 13 that it is sought to optically couple to the waveguide 12. The two components are joined to a base element 16, which is for example made of silicon. In this example, an optical device 14, a lens for example, facilitates coupling in the case where the difference in size of the optical modes in the two waveguides is too large. Although effective, these technologies require expensive equipment and take a very long time to implement because of the precise alignment required, this limiting their usefulness.

A second approach, known as "hybrid integration of III-V on silicon", is based on evanescent coupling between the waveguides of the two components. Such a type of coupling is schematically illustrated in FIG. 1B. In this example, the SiPho component comprising the waveguide 12 is produced on the silicon substrate 16, then layers of active semiconductors are arranged on the SiPho component 10 using bonding techniques, direct bonding for example, using direct epitaxy or using a polymer interface, to form the semiconductor component 11. The waveguide 13 is then defined in the stack of semiconductor layers by lithography. The precision of the alignment between the waveguides 12, 13 obtained using this method is of about 0.2 $\mu m$ (see for example Duan et al. [Ref 4] or published patent application US2013195137 [Ref 5]). The method thus described for obtaining active semiconductor waveguides very precisely aligned with SiPho waveguides makes it possible to ensure evanescent coupling between the waveguides, this limiting coupling losses even if the sizes of the modes are different. Moreover, the active material may be positioned anywhere that it is required. However, the techniques for achieving evanescent coupling between waveguides in known technologies for obtaining hybrid integration of III-V on silicon require a complex and specific hybrid technology that is not yet mature.

In particular, these techniques suffer from problems with yield and reliability, and from a limited reproducibility in particular because of the necessary step of bonding the SiPho component and the semiconductor layers. Thus, at the present time, very few laboratories have the capacity to develop this approach and even less so to demonstrate the feasibility of an industrial device.

One objective of the present description is to provide a new coupling method based on evanescent coupling between SiPho and semiconductor components designed beforehand to this end, thus providing, with respect to known methods, a better reliability and a greater process simplicity.

SUMMARY OF THE INVENTION

According to a first aspect, the present description relates to an assembly of an active semiconductor component and of a silicon-based passive optical component, said assembly being configured to couple waveguides formed in said active semiconductor component and passive optical component, respectively.

The assembly according to the first aspect comprises a carrier, and said active semiconductor component and said silicon-based passive optical component both arranged on said carrier.

According to the present description, said active semiconductor component comprises:

a first set of semiconductor layers comprising at least one first waveguide configured to guide, in a first section of the assembly, at least one first optical mode;

a second set of semiconductor layers, said set being superposed and making contact with said first set of layers, and comprising at least one second waveguide configured to guide at least one second optical mode.

Moreover, according to the present description, at least some of said layers of the first set of layers and of the second set of layers are doped to form, in a first region of the active semiconductor component, a PIN diode;

said at least one first waveguide and said at least one second waveguide are configured to allow evanescent coupling therebetween, in a second section of the assembly; and said first set of layers is etched to form, in a second region of the active semiconductor component, a first surface flush with said at least one second waveguide.

According to the present description, said silicon-based passive optical component of said assembly comprises:

a substrate;

a set of silicon-compound layers formed in a first region of the substrate and comprising at least one waveguide configured to guide at least one optical mode, said at least one waveguide lying flush with a first surface of said set of layers, which surface is opposite a second surface of said set of layers making contact with a surface of the substrate.

In the assembly according to the first aspect, said first surface of the passive optical component makes contact with said first surface of the active semiconductor component in order to allow evanescent coupling between said at least one waveguide of the passive optical component and said at least one second waveguide of said active semiconductor component.

By "flush", what is meant in the present description is that a distance between said at least one second waveguide and said first surface of the active semiconductor component, on the one hand, and a distance between said at least one waveguide and said first surface of the passive optical component, on the other hand, is sufficiently small to allow evanescent coupling between the second waveguide of the active semiconductor component and the waveguide of the passive optical component after assembly; in other words, there is, in operation, a transfer of said at least one second optical mode propagating through said at least one second waveguide of the active semiconductor component, to said at least one waveguide of the passive optical component. This distance depends on the geometry of the waveguides and on the refractive indices of the materials used to form the waveguides. According to one or more examples of embodiment, said distance is comprised between 0 and about 1 μm, and for example between 0 and about 500 nm. In an assembly according to the present description, the active semiconductor component may be designed and tested before assembly with the passive optical component. It allows a very good quality of coupling to a SiPho component to be achieved by means of two evanescent couplings, on the one hand between the first waveguide that propagates the optical mode generated in the active region of the active semiconductor component and an intermediate waveguide (the second waveguide) and on the other hand between the intermediate waveguide and the waveguide of the SiPho component, even if the optical modes are of different sizes.

According to one or more examples of embodiment, said semiconductors of the active semiconductor component comprise III-V semiconductors, for example GaAs, InP, GaN, ternary derivatives thereof, for example InGaAs, InAlAs, InGaP, InGaN, or quaternary derivatives thereof, for example InGaAsP, InGaAlAs.

According to one or more examples of embodiment, the semiconductor layers of the first set of layers of the active semiconductor component are configured to perform one or more optical functions chosen from: optical amplification, laser emission, phase modulation, electro-absorption modulation, and photodetection.

In the case of optical amplification and laser emission, the first waveguide will possibly comprise an optical gain semiconductor, and the active semiconductor component configured to inject said first waveguide with current.

Depending on the optical functions (photodetection, modulation, amplification, emission) generated by the active semiconductor component and the passive optical component, the direction of propagation of the light will be either from the active semiconductor component to the passive optical component or from the passive optical component to the active semiconductor component.

The III-V semiconductors allowing these optical functions (with the exception of phase modulation) to be generated generally exhibit high optical propagation losses (higher than 20 dB/cm) at the propagation wavelength and are thus qualified as absorbent.

According to one or more examples of embodiment, the respective geometries of said at least one first waveguide and at least one second waveguide of the active semiconductor component are configured such that an effective index of said at least one first optical mode is strictly higher than an effective index of said at least one second optical mode in the first section of the assembly and such that said effective index of said at least one first optical mode becomes strictly lower than the effective index of said at least one second optical mode in the second section of the assembly.

This inversion of the effective index of the optical modes allows the transfer by evanescent coupling of the optical mode propagating through said at least one first waveguide to said at least one second waveguide of the active semiconductor component.

According to one or more examples of embodiment, said at least one first waveguide and second waveguide of the active semiconductor component have widths that are variable in the direction of propagation of the light.

According to one or more examples of embodiment, the first waveguide of the active semiconductor component is made of a semiconductor chosen from ternary or quaternary derivatives of GaAs, InP or GaN, and preferably of InGaP, InGaAsP or InGaAlAs optionally in the form of multiple quantum wells, buried in InP.

According to one or more examples of embodiment, the second waveguide of the active semiconductor component is made of a semiconductor chosen from ternary or quaternary derivatives of GaAs, InP or GaN and preferably of bulk InGaAsP that is transparent to the propagation wavelength, buried in InP.

The transparency of the material is characterized, in the present description, by low losses at the propagation wavelength, for example losses lower than 10 dB/cm. Using a transparent material for the second waveguide of the active semiconductor component, the applicant has shown that propagation losses in the active semiconductor component may be substantially decreased, for example by a factor of 2, with respect to a case where the material of the second waveguide of the active semiconductor component is absorbent and exhibits losses at the propagation wavelength higher than 20 dB/cm.

According to one or more examples of embodiment, said first set of layers of the active semiconductor component comprises a first semiconductor layer arranged between a second semiconductor layer and a third semiconductor layer of lower refractive indices than the refractive index of the first semiconductor layer, said first layer forming said at least one first waveguide.

According to one or more examples of embodiment, said second set of layers of the active semiconductor component comprises a fourth semiconductor layer arranged between said third layer of said first set of layers and a fifth semiconductor layer, said third and fifth layers having lower refractive indices than the refractive index of the fourth semiconductor layer, said fourth layer forming said at least one second waveguide.

According to one or more examples of embodiment, one layer of the second set of layers of the active semiconductor component forms a substrate of the active semiconductor component.

According to one or more examples of embodiment, said substrate of the active semiconductor component has a thickness comprised between about 200 µm and about 1 mm. According to one or more examples of embodiment, said substrate of the active semiconductor component is made of a semiconductor with a unit cell of the same size as that of the material arranged in contact, for example a binary III-V semiconductor, for example InP, GaAs, GaSb. According to one or more examples of embodiment, said active semiconductor component comprises a plurality of N first waveguides placed in parallel, and as many second waveguides, each second waveguide being coupled to a first waveguide by evanescent coupling in the second section of the assembly.

According to one or more examples of embodiment, said active semiconductor component further comprises one or more additional waveguides arranged in series with the one or more first waveguides. The additional waveguides may allow various functionalities, such as for example a laser guide upstream of a first waveguide forming an electroabsorption modulator, to be provided. Only the one or more first waveguides are coupled to the one or more second waveguides by evanescent coupling in the second section of the component.

According to one or more examples of embodiment, the substrate of the passive optical component is made of silicon.

According to one or more examples of embodiment, the substrate of the passive optical component forms the carrier of the assembly.

According to one or more examples of embodiment, the substrate of the passive optical component comprises a first region in which is arranged said set of layers of the passive optical component, and a second region in which is arranged at least one electrical contact pad; said active semiconductor component comprises at least one electrical contact pad making contact with said first set of semiconductor layers; and said active semiconductor component is fastened to said substrate of the passive optical component in such a way that said electrical contact pad of the passive component makes contact with said electrical contact pad of the active semiconductor component.

According to one or more examples of embodiment, said electrical contact pads are metal pads that are bonded or soldered to ensure the assembly remains fastened together. Said metal pads may further be used to supply electrical power to the active semiconductor component.

The assembly thus produced, which employs double evanescent coupling, which is achieved by virtue of the presence of the one or more second waveguides, which act as intermediate waveguides, has the advantages of evanescent coupling, namely effective coupling even if the optical modes are of different sizes, tolerant to misalignments in x and in y, and extremely tolerant to misalignment in the z-direction. It also has the advantages of butt coupling in that a standard fabrication process may be used and heat is effectively dissipated removed from the active semiconductor component, which is fastened to the silicon substrate, for example by soldering.

According to one or more examples of embodiment, said set of layers of the passive optical component comprises a first silicon-compound layer arranged between a second silicon-compound layer and a third silicon-compound layer of refractive indices lower than the refractive index of the first layer, said first layer forming said at least one waveguide of the passive optical component. Silicon-on-insulator (SOI) wafers, which are commonly used in silicon microelectronics and silicon photonics, are an example of a set of layers that may be used to produce the passive optical component.

According to one or more examples of embodiment, said second and third layers are made of silicon oxide ($SiO_2$). According to one or more examples of embodiment, said first layer forming said at least one waveguide of the passive optical component comprises a material chosen from doped $SiO_2$, SiN, SiON, Si, and derivatives of Si, having a refractive index higher than said second and third layers in order to achieve optical guidance.

According to one or more examples of embodiment, the geometry of said at least one waveguide of the passive optical component is configured so that said at least one optical mode propagating through said at least one waveguide has an effective index that increases in the propagation direction in order to allow transfer, by evanescent coupling, of said at least one optical mode to said at least one second waveguide of the active semiconductor component, after assembly.

In practice, an inversion will be observed in the effective index of the optical modes propagating through said at least one waveguide of the passive optical component and said at least one second waveguide of the active semiconductor component, respectively, so as to allow transfer, by evanescent coupling, of said at least one optical mode of the passive optical component to said at least one second waveguide of the active semiconductor component.

According to one or more examples of embodiment, the silicon-based passive optical component performs at least one of the following functions: wavelength multiplexing, polarization multiplexing, filtering, modulation, photodetection, beam combining or splitting, routing, and other functionalities that lend themselves to the use of SiPho circuits known in the art.

According to one or more examples of embodiment, said assembly comprises a plurality of N waveguides in the passive optical component and as many first waveguides and second waveguides in the active semiconductor component, N being higher than or equal to 2, and N for example being comprised between 2 and 20. In operation, each first waveguide of the active semiconductor component is coupled, by evanescent coupling, to a second waveguide of the active semiconductor component, said second waveguide of the active semiconductor component being coupled, by evanescent coupling, to a waveguide of the passive optical component.

According to a second aspect, the present description relates to a method for coupling waveguides in an assembly according to the first aspect, the method comprising:
- in said first section of the assembly, propagating at least one optical mode through said at least one first waveguide of the active semiconductor component;
- in said second section of the assembly, transferring, by evanescent coupling, said at least one optical mode to said at least one second waveguide of the active semiconductor component;
- in a third section of the assembly, propagating said at least one optical mode through said at least one second waveguide of the active semiconductor component;
- in a fourth section of the assembly, transferring, by evanescent coupling, said at least one optical mode to said at least one waveguide of the passive component;
- in a fifth section of the assembly, propagating said at least one optical mode through said at least one waveguide of the passive component.

According to a third aspect, the present description relates to a process for fabricating an assembly according to the first aspect, the process comprising:
- providing said active semiconductor component;
- providing said silicon-based passive component;
- assembling said active semiconductor component and said passive component by placing said first surface of said set of layers of the passive component in contact with said first surface of the active semiconductor component.

According to one or more examples of embodiment, the substrate of said passive component comprises a first region in which is arranged said set of layers and a second region in which is arranged at least one electrical contact pad; the active semiconductor component comprises at least one electrical contact pad making contact with said first set of semiconductor layers; and assembling said active semiconductor component and said passive component comprises placing said electrical contact pad of the passive optical component in contact with said electrical contact pad of the active semiconductor component.

According to one or more examples of embodiment, said electrical contact pads of the passive optical component and of the active semiconductor component are metal pads and assembling comprises fastening said active semiconductor component and said passive component by soldering or bonding said pads.

BRIEF DESCRIPTION OF THE FIGURES

Other advantages and features of the invention will become apparent on reading the description, which is illustrated by the following figures:

FIG. 4A shows a schematic illustrating a cross-sectional view of an assembly of an active semiconductor component such as illustrated in FIG. 2A with a passive component such as illustrated in FIG. 3A, and a schematic representation of the optical propagation through various sections of the assembly;

FIG. 4B shows a schematic illustrating the variation in the effective indices of modes propagating through the various waveguides as a function of the various sections of the assembly shown in FIG. 5A;

DETAILED DESCRIPTION OF THE INVENTION

Figure 1A:
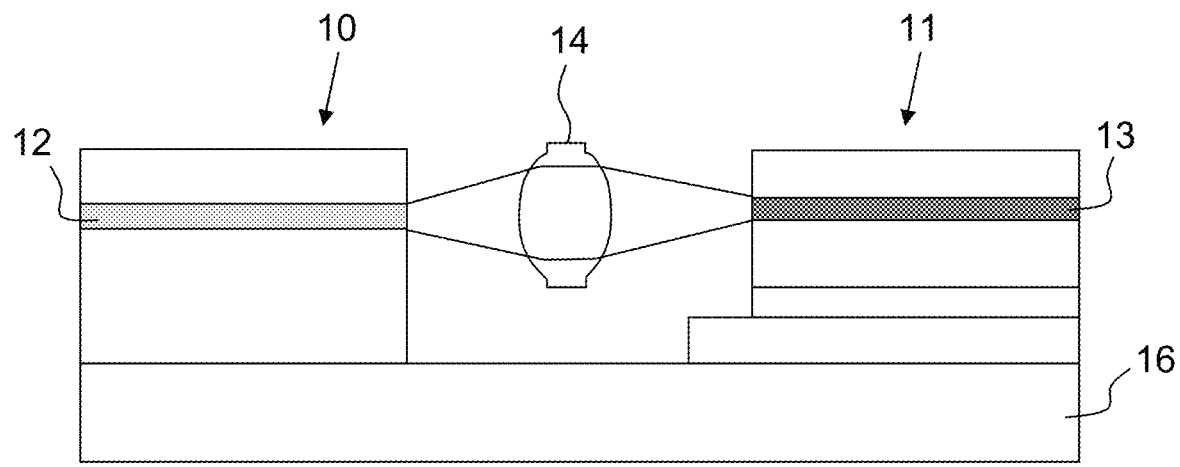
FIG. 1A, which has already been described, shows a schematic illustrating butt coupling between an active semiconductor component and a silicon-based (SiPho) component, according to the prior art.

In the figures, the elements have not been shown to scale for the sake of legibility. In particular, the horizontal and vertical axes have been shown to different scales for the sake of legibility. Furthermore, on each of the vertical and horizontal axes, the heights and widths, respectively, of the various structures and layers may be considerably different, in particular depending on the specificities and constraints of implementation.

FIGS. 2A to 2E show one example of an active semiconductor component 200 configured to be assembled with a silicon-based passive optical component, for example a component 300 such as described with reference to FIGS. 3A-3D.

The active semiconductor component 200 comprises, in this example, a first set 210 of semiconductor layers comprising at least one first waveguide 212 configured to guide at least one first optical mode, for example an optical mode generated in a gain region of the active component 200.

The active semiconductor component 200 moreover comprises a second set 220 of layers making contact with the first set 210 of layers. The second set 220 of layers comprises at least one second waveguide 222 configured to guide at least one second optical mode. The second set of layers may comprise a substrate 224, for example an InP substrate.

As will be explained in more detail below with reference to FIGS. 6A-6C, at least some of the layers of the first and second sets of layers are configured to form a PIN diode, in a region 240 of the component, by means of contacts that have been schematically shown in a simplified manner by one electrical contact pad 213 making contact with a surface 211 of the first set 210 of layers.

In the example of FIGS. 2A-2E, a single first waveguide 212 and a single second waveguide 222 have been shown; in practice, as will be illustrated below via one example of embodiment (see FIG. 8), there may be a plurality of first waveguides arranged in parallel and as many second waveguides configured to guide in parallel a plurality of optical modes.

The first waveguide 212 and the second waveguide 222 are configured to allow, in operation, a transfer, by evanescent coupling, of an optical mode propagating through the first waveguide 212 to the second waveguide 222.

Figure 2A:
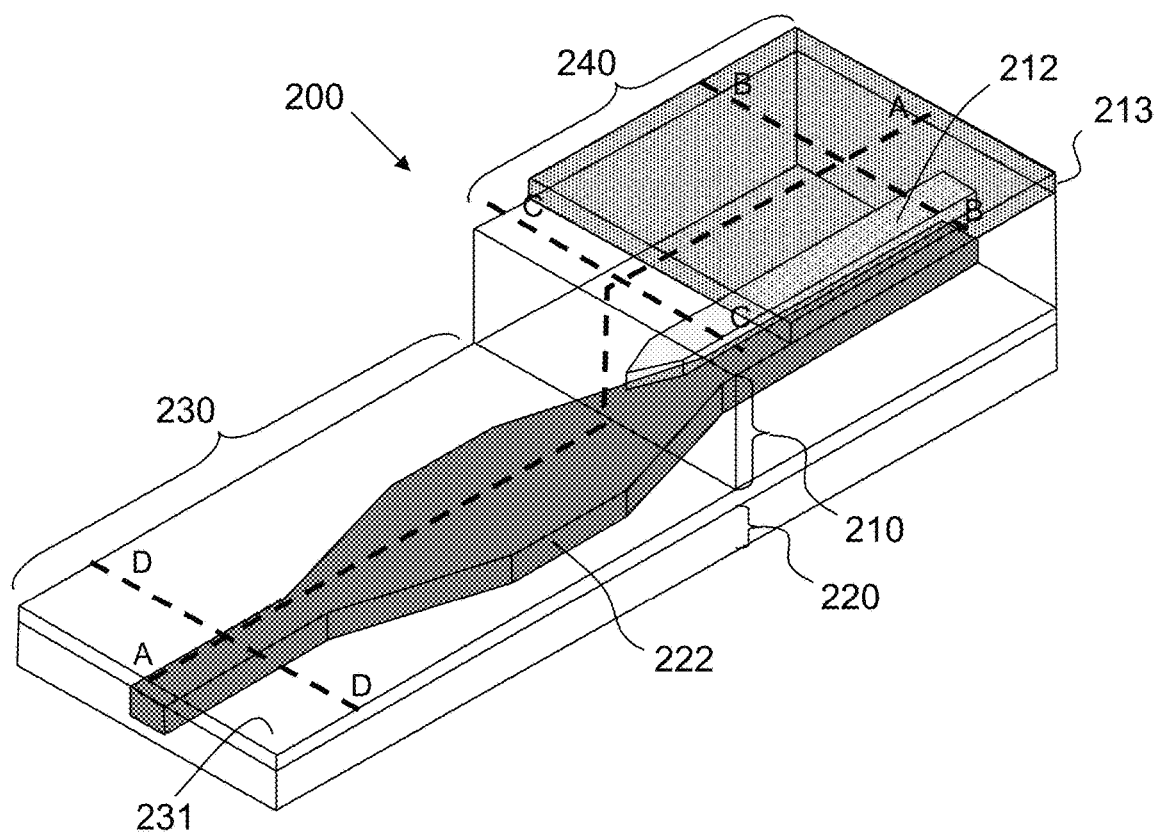
FIG. 2A shows a schematic of a semi-isometric perspective view of an active semiconductor component according to one example of the present description.
Figure 2B:
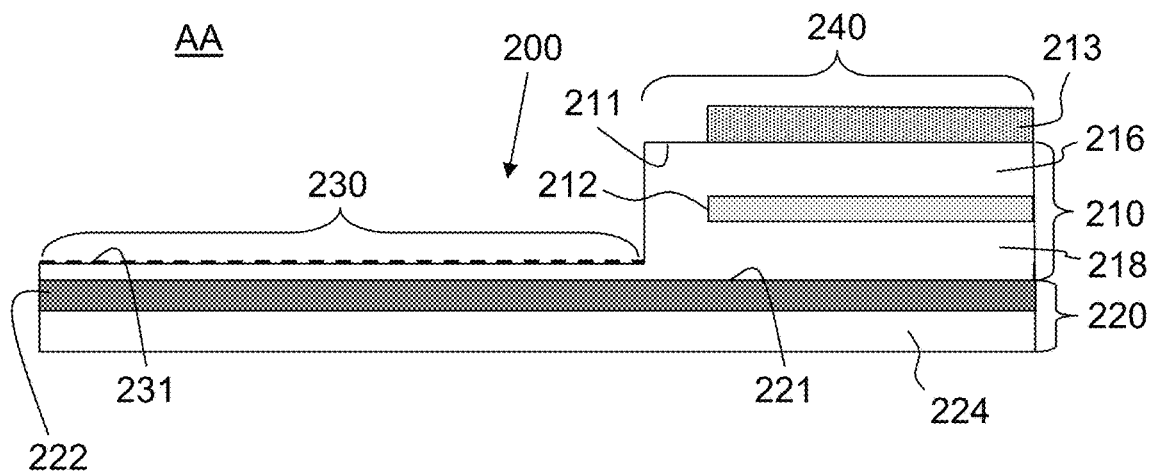
FIG. 2B shows a schematic of a cross section (cross section AA) of the active semiconductor component shown in FIG. 2A.
Figure 2C:
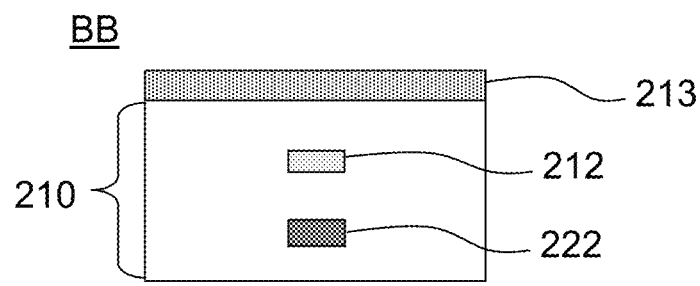
FIG. 2C shows a schematic of a cross section (cross section BB) of the active semiconductor component shown in FIG. 2A.
Figure 2D:
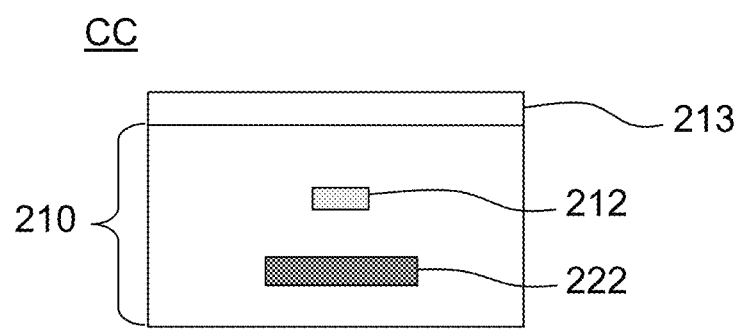
FIG. 2D shows a schematic of a cross section (cross section CC) of the active semiconductor component shown in FIG. 2A.
Figure 2E:
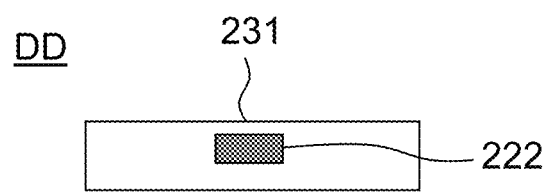
FIG. 2E shows a schematic of a cross section (cross section DD) of the active semiconductor component shown in FIG. 2A.
Figure 3A:
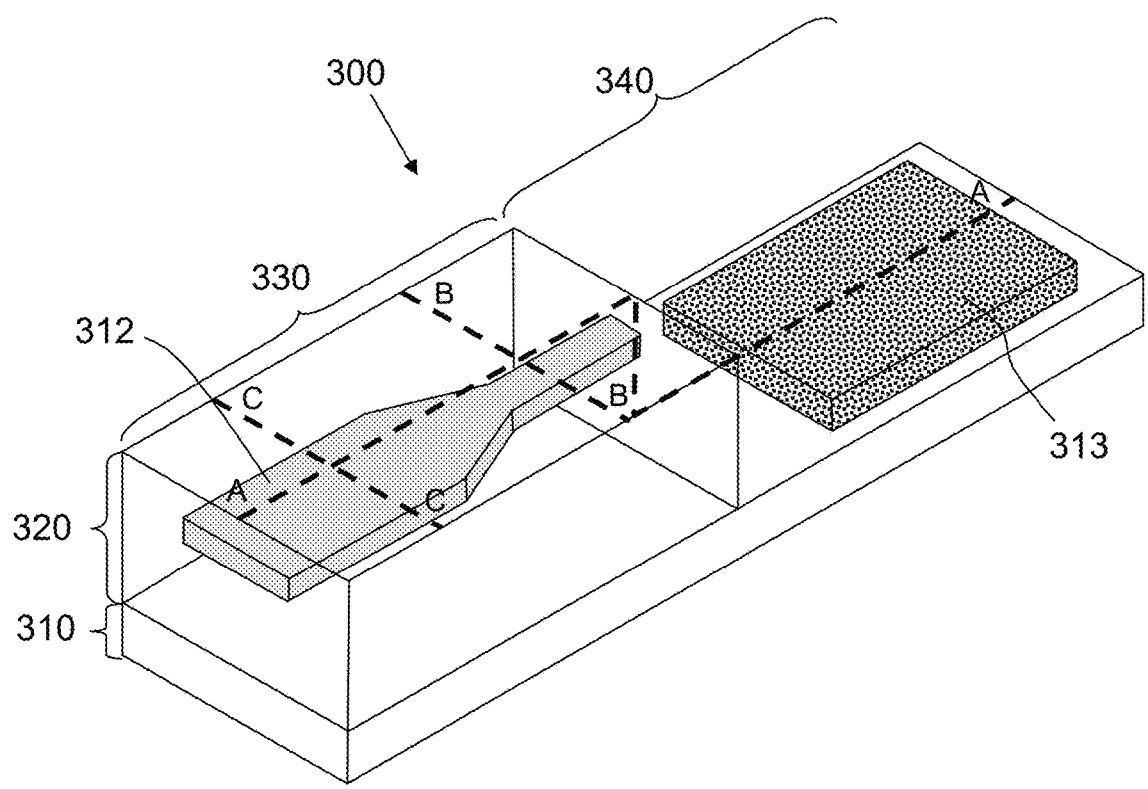
FIG. 3A shows a schematic of a semi-isometric perspective view of a silicon-based (SiPho) passive component according to one example of the present description.
Figure 3B:
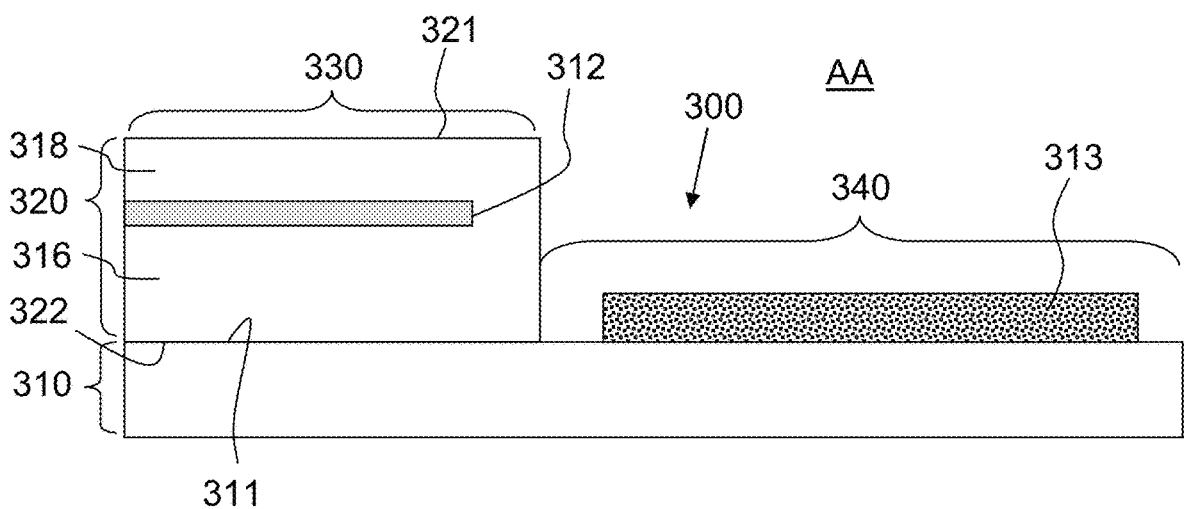
FIG. 3B shows a schematic of a cross section (cross section AA) of the silicon-based passive component shown in FIG. 3A.
Figure 3C:
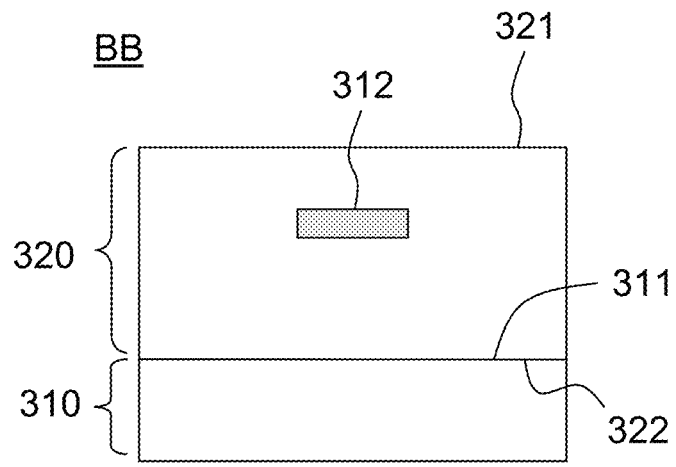
FIG. 3C shows a schematic of a cross section (cross section BB) of the silicon-based passive component shown in FIG. 3A.
Figure 3D:
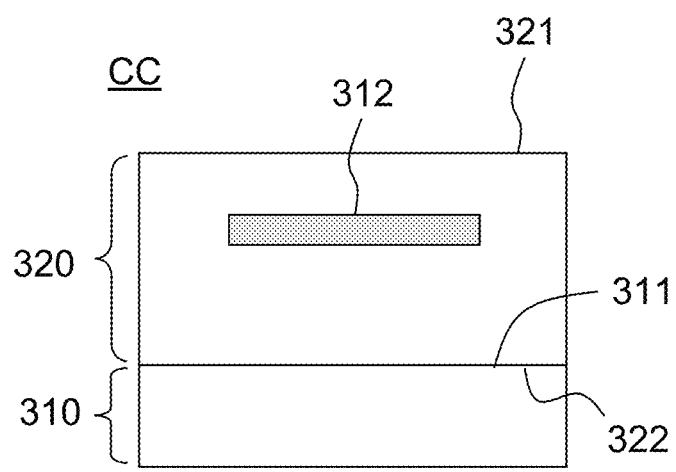
FIG. 3D shows a schematic of a cross section (cross section CC) of the silicon-based passive components shown in FIG. 3A.

Moreover, as may be seen in FIGS. 2A-2B, the first set 210 of layers is etched to form, in a region 230 of the component 200, a first surface 231 flush with the second waveguide 222. The first surface 231 is configured to be placed in contact with a surface of the passive optical component in order to transfer, by evanescent coupling, an optical mode propagating through the second waveguide to a waveguide of the passive optical component, as will be explained in more detail below.

For example, and nonlimitingly, the first waveguide 212 is formed from a layer of quaternary semiconductor, for example of bulk InGaAsP with a photoluminescence of 1.1 µm, encapsulated between two layers 216, 218 of InP, in order to form, in the optical gain region, an InP laser. The active semiconductor component according to the present description may be configured to perform an optical amplification function or other optical functions.

Thus, depending on the optical function sought for the active component 200, the first waveguide 212 may be made of optical gain material (vertical laser structure) and then be injected with electrical current in order to amplify an incident optical wave. It may also be made of a material that is transparent or absorbent at the employed operating wavelength, in general under negative voltage, in order to modify the phase of the signal (for example Mach-Zehnder phase modulator, tunable laser section) or to absorb it (photodiode, electro-absorption modulator).

The second waveguide 222 may comprise a bulk material with a photoluminescence close to the propagation wavelength, or "operating wavelength" (for example about 1.3 µm for the O telecoms band and 1.5 µm for the C telecoms band). Advantageously, the second waveguide 222 is transparent at the propagation wavelength, i.e. it exhibits losses at said wavelength lower than about 10 dB/cm.

FIGS. 3A to 3D show an example of a silicon-based passive component 300 configured to be assembled with an active semiconductor component, for example a component 200 such as described with reference to FIGS. 2A-2E.

The passive component 300 comprises, in this example, a substrate 310, for example a silicon substrate, and a set 320 of silicon-compound layers, which set is arranged, in this example, in a first region 330 of the substrate. The set 320 of layers comprises at least one waveguide 312 configured to guide at least one optical mode. For example, the waveguide 312 is obtained by encapsulating a layer between two layers 316, 318 of lower refractive index. Multiple combinations of materials may be used to form the set 320 of layers, such as, for example, and nonlimitingly, an Si waveguide buried in $SiO_2$, or a doped $SiO_2$ or SiN waveguide buried in $SiO_2$.

As above, in the example of FIGS. 3A-3D, a single waveguide 312 has been shown; in practice, as will be illustrated below via one example of embodiment (see FIG. 8), there may be a plurality of waveguides arranged in parallel to couple with a plurality of second waveguides of the active semiconductor component.

As illustrated in FIGS. 3A-3D, the waveguide 312 lies flush with a first surface 321 of the set 320 of layers, which surface is opposite a second surface 322 making contact with a surface 311 of the substrate.

The first surface 321 is configured to be placed in contact with the first surface (231, FIGS. 2A-2E) of the active component so as to achieve evanescent coupling between the waveguide 312 and the second waveguide 212 of the active semiconductor component, as will be detailed below.

Moreover, the active passive component comprises, in this example, an electrical contact pad, advantageously a metal pad, arranged in a second region 340 of the substrate 310.

FIG. 4A shows a schematic illustrating an assembly 400 of an active semiconductor component 200 such as illustrated in FIGS. 2A-2E with a passive component such as illustrated in FIGS. 3A-3D.

As illustrated in FIG. 4A, the active semiconductor component 200 is flipped and positioned on the substrate 310 of the passive component 300, which in this example forms a carrier of the assembly 400. Alignment marks and mechanical stops may be provided with a view to x-y alignment of the waveguides of the active and passive components. During assembly and during the aligning phase, the first surface 321 of the set 320 of layers of the passive component 300 is placed in contact with the first surface 231 of the active component. This makes it possible to ensure evanescent coupling between the second waveguide 222 of the active component and the waveguide 312 of the passive component.

Once the alignment has been carried out and the surfaces 321 and 231 have been placed in contact, the assembly may be solidified by bonding or soldering together the metal pads on the two components (213, FIG. 2A and FIGS. 7A/7B and 313, FIGS. 3A-3D), using known methods. These metal solder joints may also be used to supply electrical power to the active component 300 and allow a path for effective removal of heat from the active semiconductor component to be created.

A first soldering method uses, by way of metal pads 313, metal bumps that are, for example, made of gold-tin, and that are soldered to the metal contact 213 of the active component via mechanical compression and heating above the melting point of the bumps. Another method uses gold pads 313 against which the metal contacts 213 of the active component are compressed. Whatever the soldering method used, the geometries of the two components 200 and 300 and the thicknesses of the soldering pads and metal contacts of the active component will possibly be chosen such that vertical alignment is achieved by placing the surfaces 231 and 321 in contact in order to ensure the mode transfer by evanescent coupling.

To avoid any optical reflection, a medium 410 (such as BCB or an index-matching polymer for example) of index close to that of $SiO_2$ may be inserted into the free space located in section 3 of the assembly, between the active and passive components, thus avoiding an abrupt modification in effective index in proximity to the propagating optical mode.

As illustrated in FIG. 4A, the evanescent coupling between the intermediate waveguide (second waveguide 222) and the waveguide 312 of the SiPho component 300 occurs via surface contact. Therefore, it is sought to arrange the waveguides close to the surface, but no other vertical alignment with specific stop-layer thicknesses is required. This technique is compatible with many technologies. It opens the way to use of passive alignment in mass production with standard production equipment.

Figure 1B:
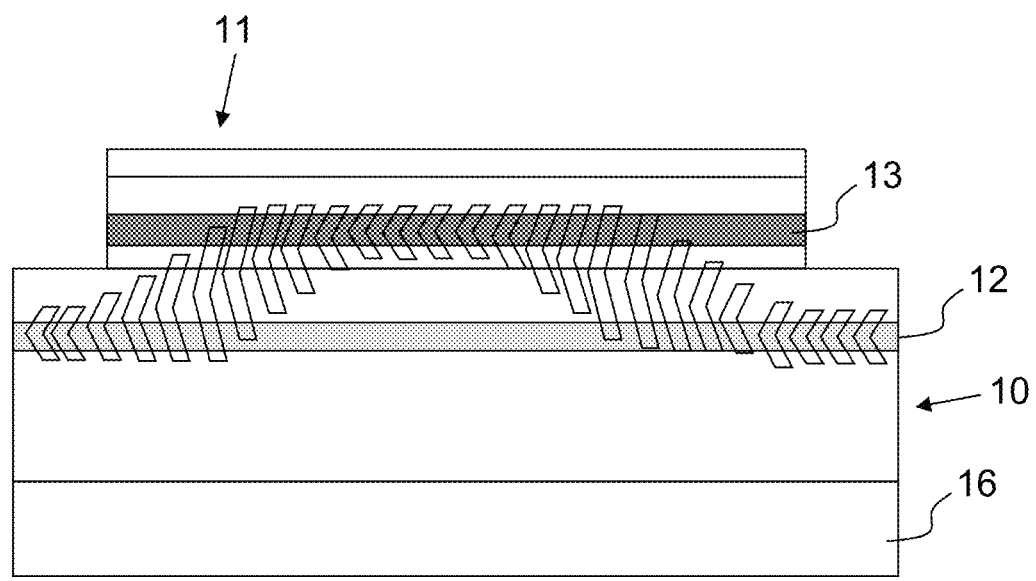
FIG. 1B, which has already been described, shows a schematic illustrating evanescent coupling between an active semiconductor component and a silicon-based (SiPho) component, according to the prior art.

FIG. 4A illustrates one technical advantage of the assembly according to the present description. In the case of evanescent coupling according to the prior art, such as for example described with reference to FIG. 1B, the active region 13 is bonded directly to the passive component above a thick layer (about 2 μm) of $SiO_2$. This material conducts heat very poorly, this leading to a poor removal of the heat generated in the active component, and therefore to a decrease in performance (in gain and reliability in particular). In the assembly according to the present description, the soldering region of the active component 200 is separated from the region where mode transition occurs via evanescent coupling. Thus, it is possible to use a standard metal solder, ensuring excellent heat removal. Moreover, this solution is compatible with any design of electrical lines on the passive component, and in particular with lines compatible with the transmission of high-frequency signals.

It will be noted that in the example of FIG. 4A, the substrate 310 of the passive optical component 300 forms the carrier of the assembly. In other examples of embodiment, depending on the application, the passive optical component 300 and the active semiconductor component 200 will possibly be arranged on an independent carrier, this possibly making assembly and alignment of the components more complex but fabrication of the passive optical component easier.

A method for coupling the first waveguide 212 of the active semiconductor component 200 and the waveguide 312 of the silicon-based passive component 300 thus comprises, in a first step, designing and fabricating the active semiconductor component and passive component according to the present description; designing together the two components in order to ensure the assembly will work well.

More precisely, each of the components possessing layers of material the refractive index of which is known to those skilled in the art, the complementary design is achieved by modifying the geometry of the various waveguides of the two components in order to allow evanescent coupling and an optimal optical mode transfer (maximum optical power transferred without reflection). To this end, known software packages (for example and nonlimitingly, Fimmwave©, OptimBPM©, Beamprop©, Lumerical©) may be used to determine the propagation of the optical modes through the various guides. These software packages are based on known computational methods (for example Finite Difference Time Domain FDTD, Beam Propagation Method BPM, EigenMode Expansion EME). For example, tapered waveguides such as described in chapter 2 of the thesis by Marco Lamponi [Ref. 6] will possibly be used.

The active and passive components may be fabricated using conventional methods, examples of which are given with reference to FIGS. 5, 6A-6C and 7.

Assembly is then carried out as described for example with reference to FIG. 4A.

In operation, coupling between the waveguides then occurs in the following way.

The first optical mode, which is for example generated in the active region of the semiconductor component 200 and guided into the first waveguide 212 (section 1 of the assembly, FIG. 4A), is transferred by evanescent coupling to the second waveguide 222 (section 2). This coupling is controlled by the fabrication process and may be made even more effective by tapering the first waveguide 212 (optionally to 0.7 μm with lithography, or to 0.2 μm with e-beam technology) and giving the second waveguide 222 the inverse taper shape. The taper shapes may be adjusted via simulation to achieve optimal coupling and a fabrication tolerance, as described previously.

In a third section of the assembly (section 3, FIG. 4A), the optical mode remains in the second waveguide 222. To avoid any optical reflection, a medium 410 (such as BCB for example) of index close to that of $SiO_2$ may be inserted into the free space between the components.

The optical mode is then coupled evanescently (section 4) from the second waveguide 222 to the Si-based (Si, $SiO_2$, SiN, etc.) waveguide 312, once again using (taper and/or inverse taper) optimized waveguide shapes (as described in [Ref. 6]), then propagated (section 5) through the waveguide 312 of the SiPho component.

The two, semiconductor and SiPho, components may simply make surface contact, this being ensured by applying pressure when soldering the semiconductor component. The distance between the Si-based waveguide and the second waveguide 222 is controlled via the thickness of the etch into the SiPho component and of the $SiO_2$ covering layer.

By choosing a highly guiding Si-based waveguide (high index contrast), it is possible to give the Si-based waveguide a high modal attraction, this allowing a high tolerance to be achieved with respect to y-axis alignment, and a complete tolerance to be achieved with respect to x-axis alignment if quite long tapers are used.

FIG. 4B shows a schematic illustrating, according to one example, the variation in the effective indices of modes propagating through the various waveguides as a function of the various sections of the assembly shown in FIG. 4A. The curves 401, 403, 405 thus show the effective mode index in the waveguides 212, 222, 312, respectively.

The index and geometry of the first waveguide 212 in section 1 are defined by the function and performance that it is desired to give for example to the laser component or to the InP circuit upstream of section 1. In this section, section 1, it is sought to make the effective index of the mode (which is given by a calculation taking into account both the geometry of the guide and the indices of the materials forming it and encircling it) propagating through the first waveguide 212 (curve 401) higher than the effective index of an optical mode that could propagate through the second waveguide 222 (curve 403). This condition of higher effective index in the first guide with respect to the second waveguide makes it possible to ensure that the optical mode propagates solely through the first waveguide in section 1.

In section 2, in this example, the geometry of both waveguides is modified (decrease in the width of one guide and increase in the width of the other for example) in order to modify the effective indices of the modes propagating through the guides and to be able, at the end of section 2, to achieve an inversion of the preceding condition. In other words, it is sought to make the effective index of the mode propagating through the first waveguide 212 (curve 401) lower than the effective index of an optical mode that could propagate through the second waveguide 222 (curve 403). This condition inversion will allow the optical mode to be transferred from the first guide to the second guide.

Once the mode has been transferred at the end of section 2, the optical mode will propagate and stabilize through section 3. Next, in section 4, the optical mode is transferred from the second waveguide 222 to the waveguide 312 of the SiPho component.

Once the optical mode has been transferred to the waveguide 312 at the end of section 4, the optical mode will stabilize in section 5 and will be able to propagate through the rest of the SiPho component.

Figure 5:
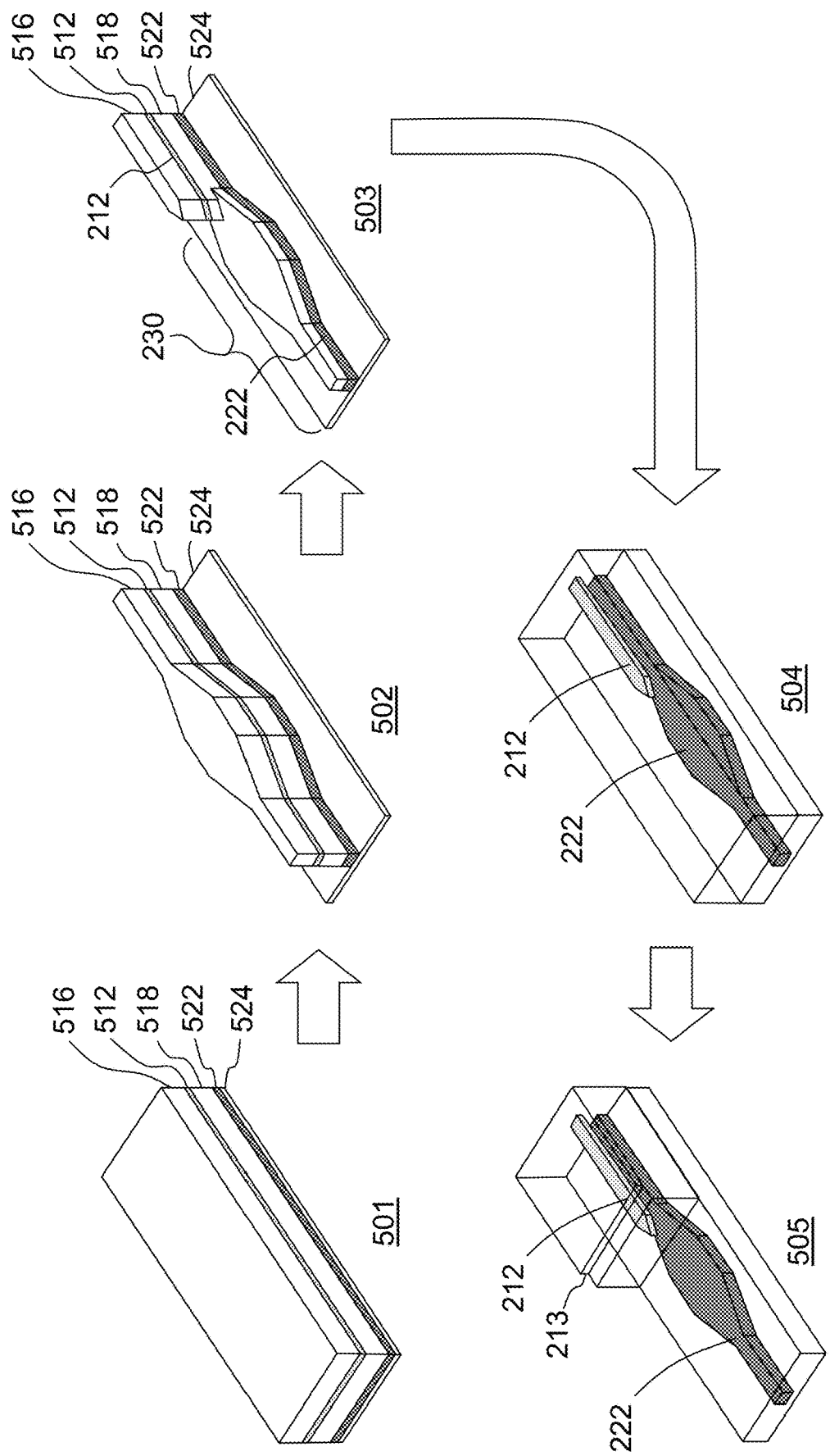
FIG. 5 illustrates, via schematics, steps of fabrication of an active semiconductor component according to one example of the present description.

FIG. 5 illustrates steps of fabrication of one exemplary active semiconductor component, according to one example of the present description.

A structure comprising a stack of semiconductor layers is produced by epitaxial growth on a substrate 524 (step 501). The set of layers for example comprises, in addition to the substrate 524 (which is for example made of InP), layers 522, 512 for forming the guides 212 and 222, which are for example made of InGaAsP, encapsulated between layers 518, 516. Depending on the type of active components desired, a person skilled in the art will use the materials required to obtain the targeted functionality. Non-exhaustively, III-V semiconductors, for example GaAs, InP, GaN, with some of their ternary derivatives, for example InGaAs, InAlAs, InGaP, InGaN, or quaternary derivatives, for example InGaAsP, InGaAlAs, may be used.

A succession of steps of photolithography, depositing dielectrics and etching dielectrics and semiconductors allows the two waveguides to be defined (step 502). The first waveguide 212 is then etched (step 503) to create a taper, known as the mode converter, in the first waveguide, this promoting evanescent coupling to the second waveguide 222, and to form an open region 230 without first waveguide. A thin etch-stop layer of a few nm above the second waveguide may be used to control the depth of this etch.

The entire structure is then buried (step 504) in an upper coating (for example, of p-doped InP in the case of formation of an InP laser). To this end, either the open region 230 is protected locally during epitaxial regrowth, or it is opened by etching, reusing the same stop layer as for the first etch. Lastly fabrication is completed (step 505), with standard steps of depositing metallization pads 213 that will subsequently be used to assemble the component and to supply it with electrical power. Passivating and thinning steps are generally carried out at the end of this fabrication process.

In the example of FIG. 5, the active semiconductor component is produced by a semiconductor buried ridge waveguide technology. The invention may also be extended to other types of technology, depending on the type of semiconductor technology used.

The active component 200 may be doped to form a PIN diode in various ways known in the art.

Figure 6:
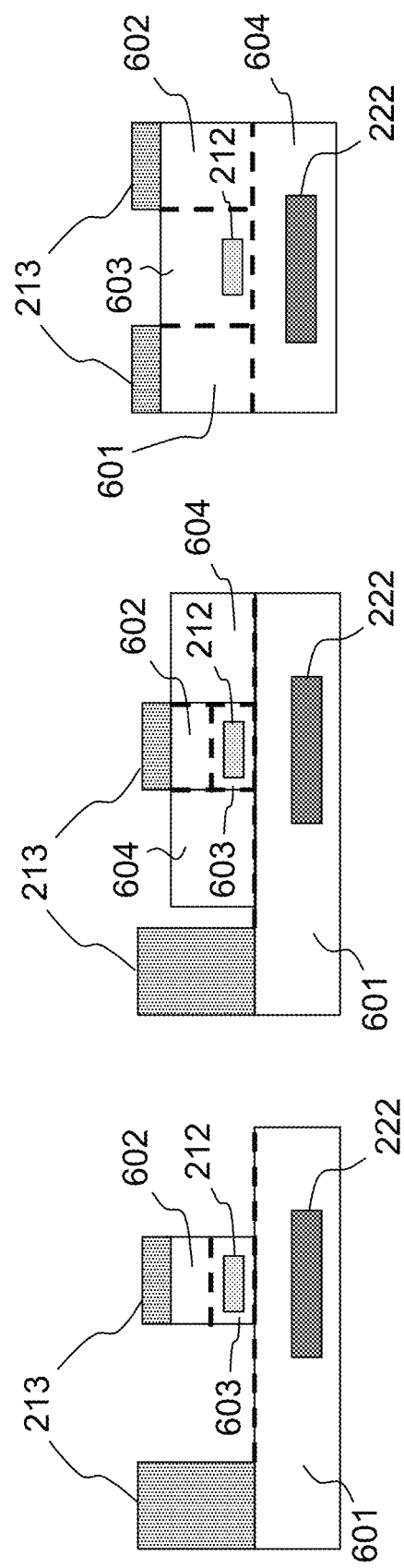
FIG. 6A shows a schematic illustrating doping in an active semiconductor according to one example of embodiment of the present description.
FIG. 6B shows a schematic illustrating doping in an active semiconductor according to one example of embodiment of the present description.
FIG. 6C shows a schematic illustrating doping in an active semiconductor according to one example of embodiment of the present description.

FIGS. 6A-6C thus show various examples of doping in which 601 represents an n-doped region, 602 represents a p-doped region, 603 represents an undoped region, and 604 represents an electrically insulating region. The p- and n-doped regions make contact with contacts 213 such as described above.

More precisely, FIGS. 6A-6C show, for the active component, three possible schemes of implementation of a PIN-diode heterostructure. FIG. 6A shows a vertical PIN diode obtained in conventional ridge waveguide technology, FIG. 6B shows a vertical PIN diode obtained by burying the optical ridge waveguide and FIG. 6C shows a lateral PIN diode obtained by burying an optical ridge waveguide and carrying out ion implantation to define the lateral diode. Other PIN-diode configurations known to those skilled in the art may be compatible with the invention and the fabrication process described with reference to FIG. 5.

Figure 7:
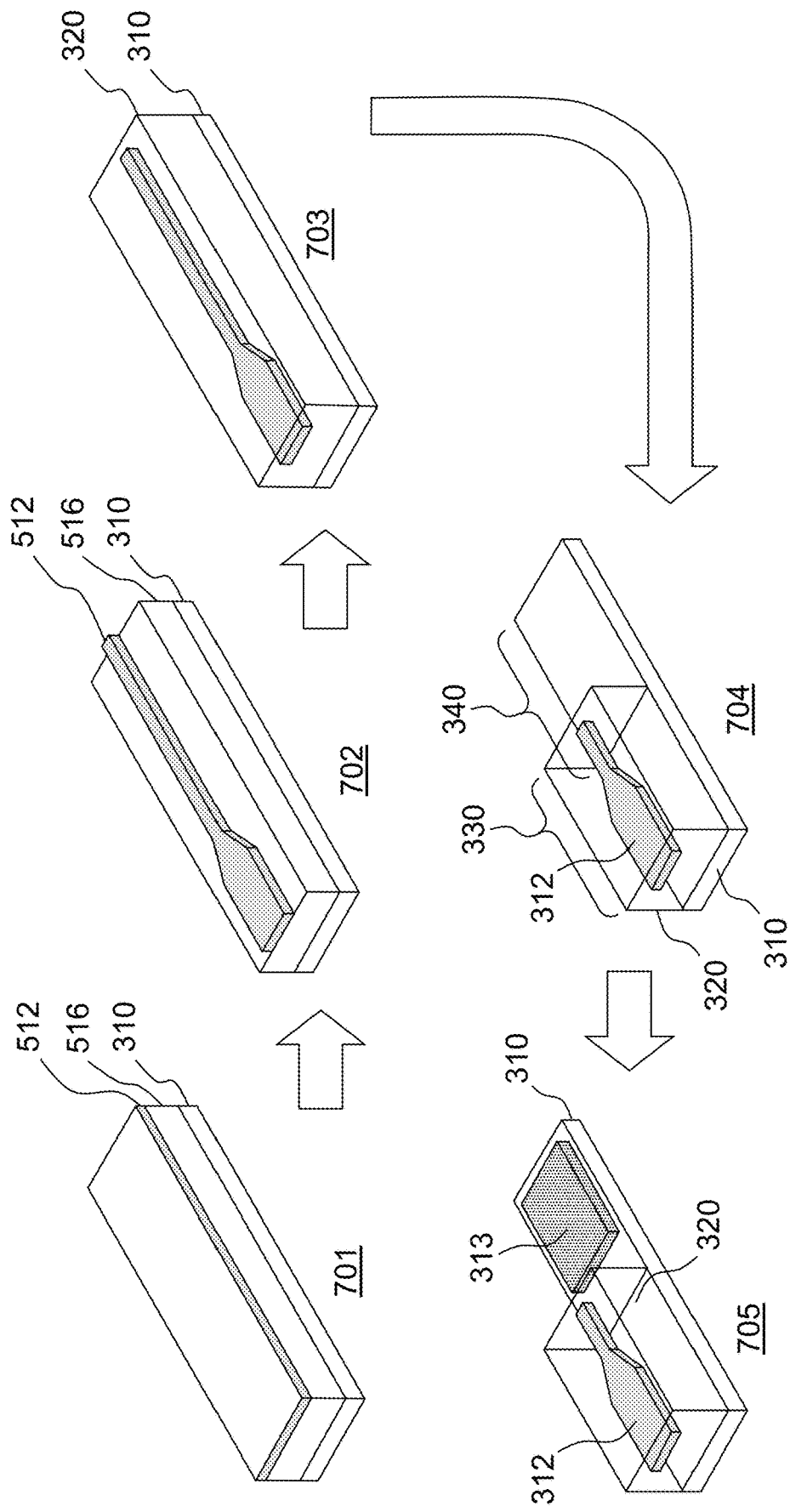
FIG. 7 illustrates, via schematics, steps of fabrication of a silicon-based passive component according to one example of the present description.

FIG. 7 illustrates steps of fabrication of one exemplary silicon-based passive component, according to one example of the present description.

The steps of fabrication of an SiPho component are standard and may comprise forming a structure (step 701) by growth or using the SmartCut process (method for fabricating SOI wafers) on the silicon substrate 310, this structure consisting of a layer 516 of $SiO_2$ and of the layer 512 intended to form the waveguide, a layer of Si for example. Next, the Si waveguide is etched (step 702) and the structure covered with an $SiO_2$ layer (step 703) in order to form the set 320 of layers. Next, a trench is etched (step 704), thus forming two regions 330, 340, the set 320 of layers being localized to the region 330. Electrical contact pads 313, for example metal solder pads, are deposited in the region 340 on the substrate 310 (step 705) in order to allow soldering to be carried out and electrical contact to be made with the active semiconductor component.

Figure 8:
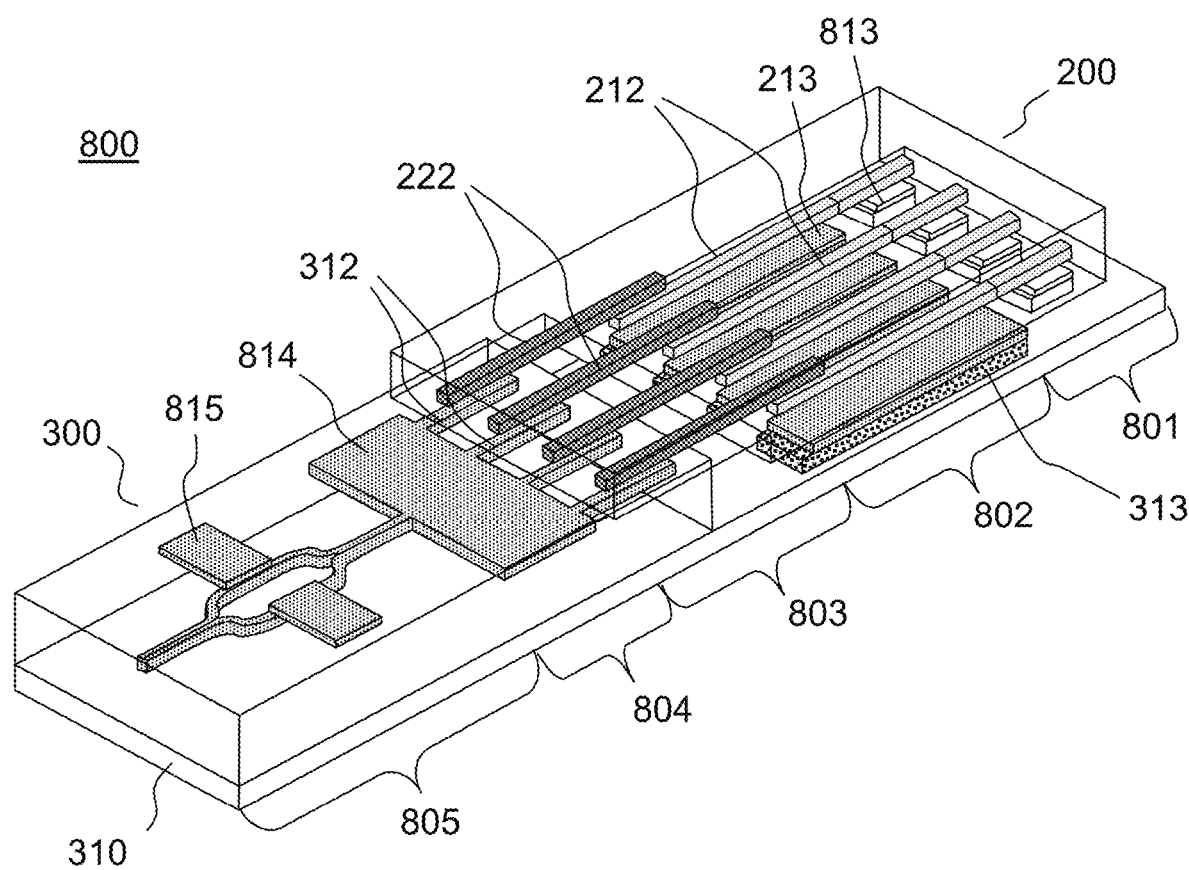
FIG. 8 shows a schematic of an assembly according to one example of embodiment of the present description.

FIG. 8 shows an assembly 800 according to the present description in one example of implementation, comprising one example of an active semiconductor component 200 and one example of a passive component 300.

More precisely, the assembly 800 illustrates multiplexing of 4 lasers at different wavelengths for modulation in the silicon.

In this example, the active semiconductor component 200 comprises an optical gain region 802 through which the first waveguides 212 are configured to guide optical modes generated by four InP lasers emitting at the 4 different wavelengths. As the assembling method does not require direct bonding or growth on an Si substrate, of the type described with respect to the prior art and with reference to FIG. 1B, the active semiconductor component may comprise other active sections (for example amplifiers), modulators and/or passive sections, for example backside InP photodiodes arranged in a region 801 of the assembly 800, as illustrated in FIG. 8. The references 811 and 812 indicate the metal contacts of the photodiodes and laser, respectively. The photodiodes comprise the entire semiconductor stack located under the metal 811 and the metal 811, and the laser comprises the entire semiconductor stack located under the metal 812 and the metal 812. The passive component 300 comprises, in this example, a multiplexer 814 in a region 804 of the assembly, which multiplexer is connected to a modulator 815, a Mach-Zehnder modulator for example, in a region 805 of the assembly.

The region 803 of the assembly corresponds to a coupling region such as described in more detail by means of FIGS. 4A and 4B. In particular, evanescent coupling between the second waveguides 222 of the active component 200 and the waveguides 312 of the passive component, which are connected to the multiplexer 814, is observed therein.

Of course, the exemplary assembly illustrated in FIG. 8 is nonlimiting and other examples may be given that use one or more assemblies connected one after another. For example:

- emission of 2 orthogonally polarized lasers into the active component and combination of the two polarizations in the silicon and transfer to an optical fiber using a vertical coupler;
- coupling an external multi-wavelength laser emitting a frequency comb, demultiplexing in a passive component, modulation of the various wavelengths in an array of electro-absorption modulators in an active component, and multiplexing in a second passive component;
- gain section in an active component, coupled to a selective tunable ring-based or Mach-Zehnder filter in the passive component to create a wavelength-tunable cavity laser;
- emission into a first active component of 4 lasers with various wavelengths, multiplexing and Mach-Zehnder modulation, demultiplexing in a passive component and photodetection in a second active component.

Although described through a certain number of examples of embodiment, the assembly and coupling method described in the present description comprise various variants, modifications and improvements that will appear obvious to anyone skilled in the art, and it will be understood that these various variants, modifications and improvements fall within the scope of the invention such as defined by the following claims.

REFERENCES

Ref. 1. K. Janiak et al., "1.55 μm BH-DFB laser with integrated spot-size converter for flip-chip applications" 16th IPRM. 2004 International Conference on Indium Phosphide and Related Materials, 2004., Kagoshima, 2004, pp. 476-479.

Ref. 2. Yamada, Hirohito. "Analysis of Optical Coupling for SOI Waveguides." Piers Online, vol. 6, No. 2, 2010.

Ref. 3. Y. Gao et al., "Hybrid Integration With Efficient Ball Lens-Based Optical Coupling for Compact WDM Transmitters" in IEEE Photonics Technology Letters, vol. 28, no. 22, pp. 2549-2552, 15 Nov. 15, 2016.

Ref. 4. G. Duan et al., "Hybrid III-V on Silicon Lasers for Photonic Integrated Circuits on Silicon" in IEEE Journal of Selected Topics in Quantum Electronics, vol. 20, no. 4, pp. 158-170, July-August 2014, Art no. 6100213.

Ref. 5. Published patent application US2013/0195137A1.

Ref. 6. Marco Lamponi, "Hybrid III-V on silicon lasers for telecommunication applications", PhD Thesis, Chapter 2, 2012.

The invention claimed is:

1. An assembly of an active semiconductor component and of a silicon-based passive optical component, said assembly comprising:
    a carrier; and
    said active semiconductor component and said passive optical component both arranged on said carrier, and wherein:
    said active semiconductor component comprises:
    a first set of semiconductor layers comprising at least one first waveguide configured to guide, in a first section of the assembly, at least one first optical mode;
    a second set of semiconductor layers, said set being superposed and making contact with said first set of layers, and comprising at least one second waveguide configured to guide at least one second optical mode; wherein
    at least some of said layers of the first set of layers and of the second set of layers are doped to form, in a first region of the component, a PIN diode;
    said at least one first waveguide and said at least one second waveguide are configured to allow evanescent coupling therebetween, in a second section of the assembly;
    said first set of layers is etched to form, in a second region of the active semiconductor component, a first surface flush with said second waveguide;
    said passive component comprises:
    a substrate;
    a set of silicon-compound layers comprising at least one waveguide configured to guide at least one optical mode; and wherein:
    said at least one waveguide lies flush with a first surface of said set of layers, which surface is opposite a second surface of said set of layers making contact with a surface of the substrate; and wherein
    said first surface of the passive optical component makes contact with said first surface of said active semiconductor component in order to allow evanescent coupling between said at least one waveguide of the passive optical component and said at least one second waveguide of said active semiconductor component.

2. The assembly as claimed in claim 1, wherein the carrier of the assembly is formed by said substrate of the passive optical component.

3. The assembly as claimed in claim 2, wherein:
    the substrate of said passive component comprises a first region in which is arranged said set of layers, and a second region in which is arranged at least one electrical contact pad;
    said active semiconductor component comprises at least one electrical contact pad making contact with said first set of semiconductor layers;
    said active semiconductor component is fastened to said substrate of the passive optical component in such a way that said electrical contact pad of the passive component makes contact with said electrical contact pad of the active semiconductor component.

4. The assembly as claimed in claim 1, wherein the geometries of said at least one first waveguide and at least one second waveguide of the active semiconductor component are configured such that an effective index of said at least one first optical mode is strictly higher than an effective index of said at least one second optical mode in the first section of the assembly and such that said effective index of said at least one first optical mode becomes strictly lower than the effective index of said at least one second optical mode in the second section of the assembly.

5. The assembly as claimed in claim 1, wherein a distance between said at least one second waveguide and said first surface (231) of the active semiconductor component is comprised between 0 and about 1μm.

6. The assembly as claimed in claim 1, wherein a distance between said at least one waveguide and said first surface of the passive optical component is comprised between 0 and about 1 μm.

7. The assembly as claimed in claim 1, wherein the semiconductor layers of the first set of layers of the active semiconductor component are configured to perform one or more optical functions chosen from: optical amplification, laser emission, phase modulation, electro-absorption modulation, and photodetection.

8. The assembly as claimed in claim 1, wherein the layers of the set of layers of the passive optical component are configured to perform one or more of the following functions: wavelength multiplexing, polarization multiplexing, filtering, modulation, photodetection, beam combining or splitting, and routing.

9. The assembly as claimed in claim 1, wherein:
the passive optical component comprises a plurality of N waveguides placed in parallel, where N is an integer higher than or equal to 2;
the active semiconductor component comprises a plurality of N first waveguides and a plurality of N second waveguides, said first waveguides and said second waveguides being placed in parallel, and wherein:
in operation, each first waveguide of the active semiconductor component is coupled, by evanescent coupling, to a second waveguide of the active semiconductor component, said second waveguide of the active semiconductor component being coupled, by evanescent coupling, to a waveguide of the passive optical component.

10. A method for coupling waveguides in an assembly as claimed in claim 1, comprising:
in said first section of the assembly, propagating at least one optical mode through said at least one first waveguide of the active component;
in said second section of the assembly, transferring, by evanescent coupling, said at least one optical mode to said at least one second waveguide of the active component;
in a third section of the assembly, propagating said at least one optical mode through said at least one second waveguide of the active component;
in a fourth section of the assembly, transferring, by evanescent coupling, said at least one optical mode to said at least one waveguide of the passive component;
in a fifth section of the assembly, propagating said at least one optical mode through said at least one waveguide of the passive component.

11. A process for fabricating an assembly as claimed in claim 1, comprising:
providing said active semiconductor component;
providing said silicon-based passive component;
assembling said active semiconductor component and said passive component by placing said first surface of said set of layers of the passive component in contact with said first surface of the active semiconductor component.

12. The process for fabricating an assembly as claimed in claim 11, wherein:
the substrate of said passive component comprises a first region in which is arranged said set of layers and a second region in which is arranged at least one electrical contact pad;
said active semiconductor component comprises at least one electrical contact pad making contact with said first set of semiconductor layers; and wherein:
assembling said active semiconductor component and said passive component comprises placing said electrical contact pad of the passive optical component in contact with said electrical contact pad of the active semiconductor component.

13. The process for fabricating an assembly as claimed in claim 12, wherein said electrical contact pads of the passive optical component and of the active semiconductor component are metal pads and assembling comprises fastening said active semiconductor component and said passive component by soldering or bonding said pads.

* * * * *